US008100283B2

(12) United States Patent
Nyeboer et al.

(10) Patent No.: US 8,100,283 B2

(45) Date of Patent: Jan. 24, 2012

(54) DUNNAGE STRUCTURE MADE WITH MULTIPLE PLY PARTITIONS

(75) Inventors: Calvin D. Nyeboer, Holland, MI (US); William J. Vroon, Holland, MI (US)

(73) Assignee: Bradford Company, Holland, MI (US)

( * ) Notice: Subject to any disclaimer, the term of this patent is extended or adjusted under 35 U.S.C. 154(b) by 341 days.

(21) Appl. No.: 12/175,983

(22) Filed: Jul. 18, 2008

(65) Prior Publication Data

US 2008/0296357 A1 Dec. 4, 2008

Related U.S. Application Data

(63) Continuation-in-part of application No. 12/013,002, filed on Jan. 11, 2008, now abandoned, and a continuation of application No. 11/036,809, filed on Jan. 14, 2005, now Pat. No. 7,344,043.

(51) Int. Cl.

| | |
|---|---|
| ***B65D 1/24*** | (2006.01) |
| ***B32B 3/00*** | (2006.01) |
| ***B32B 7/08*** | (2006.01) |

(52) U.S. Cl. .......................... 220/545; 428/57; 428/223

(58) Field of Classification Search ................. 220/552, 220/559, 530, 535, 538, 539, 541, 542, 545, 220/557; 156/196, 227, 290, 292, 308.2, 156/308.4, 309.6, 309.9; 428/223, 198, 101, 428/57

See application file for complete search history.

(56) References Cited

U.S. PATENT DOCUMENTS

| | | | | | |
|---|---|---|---|---|---|
| 2,647,679 | A | | 8/1953 | Schilling et al. | |
| 3,399,098 | A | | 8/1968 | Omoto et al. | |
| 3,487,479 | A | | 1/1970 | Grooms | |
| 3,647,607 | A | | 3/1972 | Hillers | |
| 3,654,013 | A | * | 4/1972 | Willsie et al. | 156/212 |
| 3,859,161 | A | | 1/1975 | McLeod | |
| 3,873,407 | A | | 3/1975 | Kumata et al. | |
| 3,921,891 | A | | 11/1975 | Gorham | |
| 4,119,583 | A | * | 10/1978 | Filip et al. | 521/103 |
| 4,127,304 | A | | 11/1978 | Gardner | |
| 4,224,376 | A | | 9/1980 | Ishige et al. | |
| 4,305,988 | A | * | 12/1981 | Kocher | 428/158 |
| 4,333,978 | A | * | 6/1982 | Kocher | 428/158 |
| 4,375,263 | A | | 3/1983 | Dworkin | |
| 4,608,104 | A | * | 8/1986 | Holtrop et al. | 156/78 |
| 4,868,025 | A | * | 9/1989 | Strzelewicz | 428/35.2 |
| 4,898,640 | A | | 2/1990 | O'Connor | |
| 5,287,961 | A | * | 2/1994 | Herran | 206/219 |
| 5,356,004 | A | * | 10/1994 | Weinreb | 206/316.2 |
| 5,732,876 | A | | 3/1998 | Bradford | |
| 5,788,146 | A | | 8/1998 | Bradford et al. | |
| 5,876,813 | A | | 3/1999 | Bambara et al. | |

(Continued)

FOREIGN PATENT DOCUMENTS

JP 404065235 A 3/1992

*Primary Examiner* — Mickey Yu

*Assistant Examiner* — Shawn Braden

(74) *Attorney, Agent, or Firm* — Wood, Herron & Evans, LLP

(57) ABSTRACT

A dunnage structure comprising a partition matrix made up of folded partitions, each of the partitions having two plies fused together in select locations. The partitions may be made by folding a partition blank and securing a portion of the folded partition blank to itself in predetermined locations. Passages extend through portions of the partitions to allow multiple partitions to be secured together using connectors.

3 Claims, 14 Drawing Sheets

U.S. PATENT DOCUMENTS

| | | | | |
|---|---|---|---|---|
| 5,882,776 | A | 3/1999 | Bambara et al. | |
| 5,885,679 | A * | 3/1999 | Yasue et al. | 428/57 |
| 5,938,878 | A | 8/1999 | Hurley et al. | |
| 6,054,005 | A | 4/2000 | Hurley et al. | |
| 6,167,790 | B1 | 1/2001 | Bambara et al. | |
| 6,375,779 | B1 | 4/2002 | Melquist et al. | |
| 6,416,854 | B2 | 7/2002 | Hunter, Jr. | |
| 6,460,955 | B1 * | 10/2002 | Vaughan et al. | 312/401 |
| RE38,707 | E * | 3/2005 | Merkel | 211/135 |
| 7,344,043 | B2 | 3/2008 | Nyeboer | |
| 2004/0118854 | A1 | 6/2004 | Kutun | |
| 2008/0095961 | A1 * | 4/2008 | Knauf | 428/36.1 |

* cited by examiner

DUNNAGE STRUCTURE MADE WITH MULTIPLE PLY PARTITIONS

CROSS REFERENCE TO RELATED APPLICATIONS

This application is a continuation-in-part of U.S. patent application Ser. No. 12/013,002 filed Jan. 11, 2008 entitled “Partition Assembly Made With Multiple Ply Partitions”, which is fully incorporated by reference herein. U.S. patent application Ser. No. 12/013,002 is a continuation of U.S. patent application Ser. No. 11/036,809 filed Jan. 14, 2005, now U.S. Pat. No. 7,344,043, entitled “Partition Assembly Made With Multiple Ply Partitions”, which is fully incorporated by reference herein.

FIELD OF THE INVENTION

The present invention relates to a dunnage structure for dividing the space inside a container; more particularly to a multiple ply partition for use in such a dunnage structure.

BACKGROUND

In the storage, shipment or display of parts or merchandise, it is a common practice to divide the interior of a box or container into a plurality of individual cells. The interior of a box or container is typically separated by a series of dividers, one set of parallel dividers being orthogonal to a second set of dividers. The dividers separate the interior of the container into a plurality of individual holding cells each of which is intended to hold a separate item for display and/or shipment. The division of the interior of the box or container helps prevent the items therein from contacting one another and breaking during shipping. The division or partitioning of the container also aids in the loading and unloading of the items therein, as well as inventorying the contents of each box or container.

The dividers typically are slotted and arranged in an orthogonal relationship to divide the interior of the box or container into a desired number of holding cells. The dividers are slotted in a manner that enables the dividers to engage with one another at the location of the slots so that the dividers form an orthogonal grid or matrix. Typically the dividers are made of the same material as the material of the box or container, plastic or paperboard. However, the dividers may be constructed of any suitable material with sufficient rigidity to prevent the contents of the container from contacting one another and being damaged.

One disadvantage with known partition assemblies is that the upper edges of the partitions may have exposed sharp edges. For example, corrugated plastic partitions may have sharp upper edges created by cutting a sheet of corrugated plastic to the desired partition size. Such an exposed upper edge of the partition may damage products or parts being loaded into or unloaded from the cells of the container in which is located the partition matrix or assembly. Partition assemblies incorporating partitions having exposed sharp upper edges may require additional clearance between the parts being either loaded or unloaded and the upper edges of the partitions.

Another disadvantage of such partition assemblies is that the person loading or unloading parts or products into or from the cells of the container may cut or scrape their knuckles or hands on the exposed edges of the partitions when loading or unloading parts or products.

Additionally, the stiffness of the partitions of the assembly is dictated by the material from which the partitions are made. The stiffness of the partitions may not be altered without changing the material from which the partition is made.

U.S. Pat. No. 2,647,679 discloses a partition assembly which separates the interior of a box or container into a plurality of cells. The partitions of the assembly disclosed in this patent are formed by folding a blank of material along a fold line so as to create a rounded smooth upper edge. The material is disclosed as being paper board or similar material.

Another partition assembly for dividing the interior of a container is disclosed in U.S. Pat. No. 4,375,263. The partitions of this assembly are similarly rounded along their upper edges and are made of transparent vinyl sheets.

In each of these prior art partition assemblies, the opposed plies of the dividers or partitions formed by folding a blank of material are not secured to each other. Consequently, the opposed sides or plies of the partitions are not secured to each other and may be easily separate, thereby expanding into the cells of the container defined by the partition assembly.

Consequently, the partitions may contact the products or parts stored in the cells and damage them. Additionally, the partition plies may easily tear or otherwise be damaged. Upon assembly or disassembly of the partition matrix, one or more portions of the partitions may tear and hence cause disassembly of at least a portion of the partition matrix.

It therefore has been one objective of the present invention to provide a double-ply partition for use in a dunnage structure in which the plies are secured together in predetermined locations and have passages for joining multiple partitions together.

It has been a further objective of the invention to provide a method of manufacturing a double-ply partition for use in a dunnage structure which is secure and may not be easily disassembled.

It has been another objective of the present invention to provide a double-ply partition for use in a dunnage structure in which the partition has the desired degree of stiffness.

SUMMARY OF THE INVENTION

The dunnage structure of the present invention which accomplishes these objectives comprises a plurality of two-ply partitions which are folded and secured together to form a plurality of holding cells into which different parts are stored for shipment or display. The partitions are joined together with a plurality of connectors which extend through passages of the partitions.

In one embodiment, each partition is formed of a multilayered material folded in half and secured to itself at select or predetermined locations. The fold creates a rounded edge at the fold line which is smooth and has a continuous surface with the outer side walls or skins of the partition. The partition comprises an inner layer of foam, preferably polyolefin foam, and an outer layer, skin or facegood. The opposed plies of the partition are fused or parent welded to each other at select or predetermined locations using only heat without any additional material required. Along the passages of the partition, the opposed plies are not secured to each other, allowing a connector to pass between the opposed plies of the partition. In this manner, the opposed plies of the partition are partially fused or joined together without any additional material such as glue.

In one embodiment, the inner foam layer is bonded directly or laminated to the outer layer. The outer layer may be made of woven polyester, non-woven polypropylene, foamed or solid polyolefin or other material such as latex or non-polyolefin plastic. The outer layer may be selected as appropriate to protect or prevent surface damage to the products being stored and/or shipped in the cells of the container.

In an alternative embodiment, a desired stiffness or rigidity may be created in the partition by inserting into the partition blank from which the partition is made a thin plastic skin or middle layer between the inner foam layer and the outer layer or facegood. By altering the thickness and/or mechanical properties of this middle layer, or by omitting it altogether, the desired level or degree of stiffness of the partition may be achieved during the manufacturing process.

In an alternative embodiment, the partition may be made solely of one foam layer without any outer layer or facegood.

The method of making a two-ply partition by securing select portions of opposed plies of the partition together is quick, easy and inexpensive. Portions of the opposed plies of the partition are permanently secured to each other, making the partition non-disassembling and enhanced by being double layered or double ply without using any additional material or tools. Other portions of the opposed plies of the partition are not permanently secured to each other and define passages adapted to receive and retain the connectors used to join together multiple partitions.

A dunnage structure incorporating one or more two-ply partitions having passages may be quickly and easily formed by passing multiple connectors through the passages of multiple folded partitions. The next step comprises securing opposed ends of the connectors to an anchor which may be a top of the dunnage structure or any similar type device or structure. A dunnage structure formed in such a manner may be used in a horizontal dispensing container or any other similar shipping container such as a metal rack, for example.

DETAILED DESCRIPTION OF THE DRAWINGS

Figure 1:
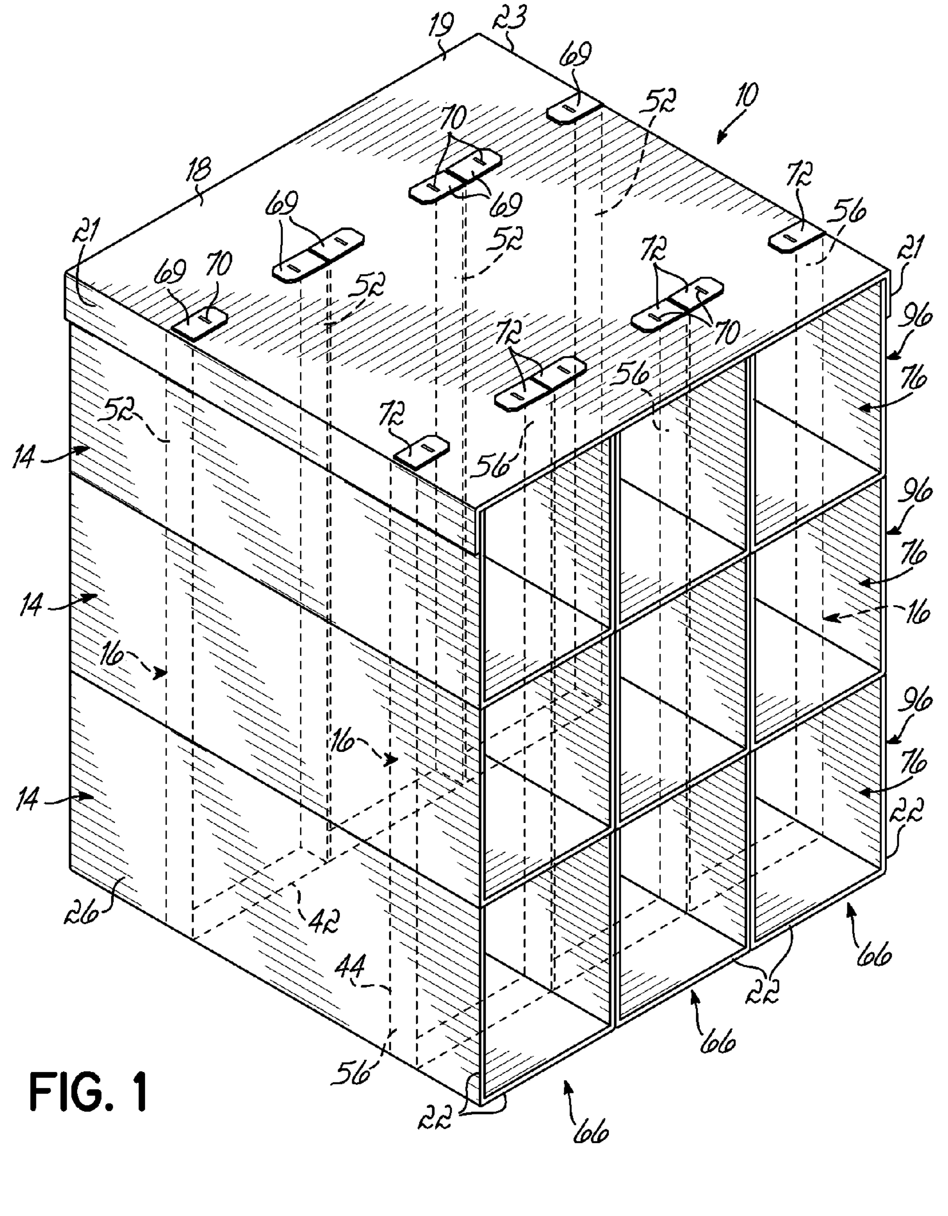
FIG. 1 is a perspective view of one embodiment of dunnage structure of the present invention in an assembled condition.

Referring to the drawings and particularly to FIG. 1, there is illustrated a dunnage structure 10 for dividing the space inside a container. The dunnage structure 10 may be used in any container and in particular any horizontal dispensing container including a metal rack like the ones shown in FIGS. 5 and 6. Alternatively, the dunnage structure may be used in a container known in the industry as a Redi-Rack® shown in FIGS. 7 and 8. The present invention is not intended to be limited for use in any one style or type of container.

As illustrated in FIG. 1, one embodiment of dunnage structure 10 comprises a plurality of partition trays 14 joined together with connectors 16 and a top 18. For purposes of this document, the term "tray" is not intended to be limited to any dictionary definition or the exact "tray" shown in the drawings. The term "tray" is intended to mean any partition folded and formed into a structure having a bottom and two opposed side walls. Similarly, the term "dunnage structure" is not intended to be limited to any embodiment shown or described herein, but rather is intended to mean any number of pieces or parts held or put together for separating and protecting products for shipment.

Figure 2:
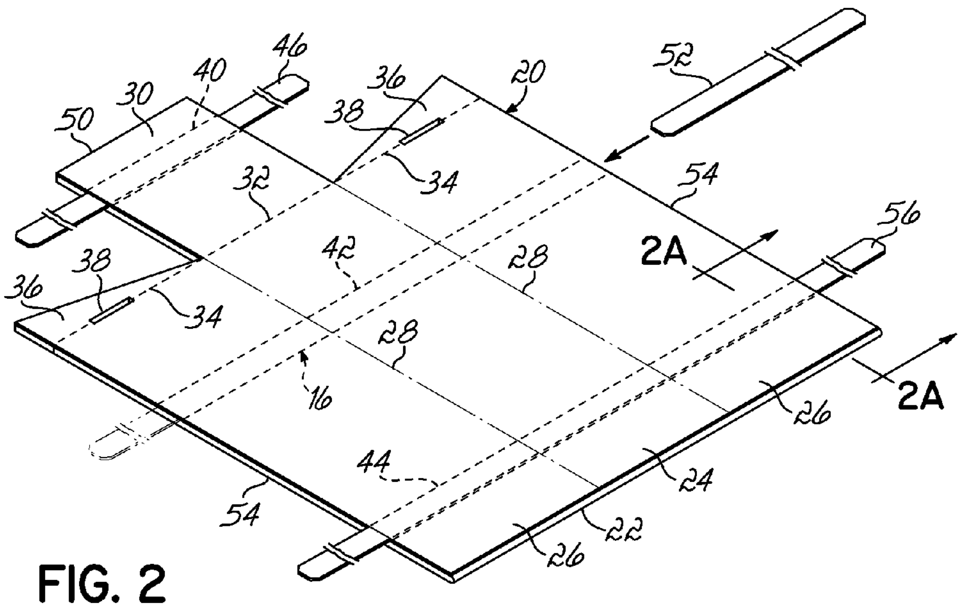
FIG. 2 is a perspective view of a blank used to form a folded partition for use in the dunnage structure of FIG. 1 with connectors.

As shown in FIG. 2, in one embodiment, each tray 14 is formed from a two-ply partition 20 having a rounded front edge 22. As shown in FIG. 2, the partition 20 has a middle portion 24 and two opposed side portions 26, the middle portion 24 being separated from the side portions 26 by parallel fold lines 28. The partition 20 has a generally rectangular rear portion 30 separated from the remainder of the middle portion 24 by a fold line 32. The partition 20 has additional fold lines 34 which may be omitted, if desired. Two aligned slots 38 are aligned with fold lines 34. Each slot 38 extends through the partition 20. Two generally triangular locking portions 36 are located behind the slots 38 and fold lines 34, as shown in FIG. 2. The partition 20 may be other shapes or sizes and is not intended to be limited to the configuration shown in FIG. 2. For example, the locking portions 36 may be rectangular rather than triangular.

As shown in FIG. 2, the partition 20 has a first passage 40 through the rear portion 30 of the partition 20 and second and third passages 42, 44, each extending through middle and side portions 24, 26 of the partition 20, respectively. Although the drawings show the partition 20 having three parallel passages 40, 42 and 44, the partition 20 may have any number of passages of any desired width in any desired locations.

FIG. 2 shows a first connector 46 extending through the first passage 40 and beyond the opposed side edges 48 of the rear portion 30 of partition 20. In the illustrated embodiment, the first connector 46 extending through the first passage 40 is generally parallel the front and rear edges 22, 50 of the partition 20. FIG. 2 further shows second connector 52 entering second passage 42. When fully extending through the second passage 42, the second connector 52 extends beyond the opposed outer side edges 54 of the side portions 26 of partition 20. Lastly, FIG. 2 shows the third connector 56 extending through third passage 44 and extending beyond the outer edges 54 of the partition 20.

The connectors 16 in any of the embodiments may be made of plastic such as polyvinyl chloride, high density polyethylene or nylon. However, any other suitable materials, such as metal, may be used in the connectors. The connectors may be any desired shape, width or length, depending upon the application.

Figure 2A:
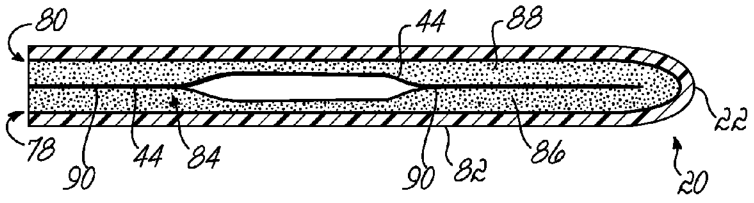
FIG. 2A is a cross-sectional view taken along the line 2A-2A of FIG. 2.
Figure 2B:
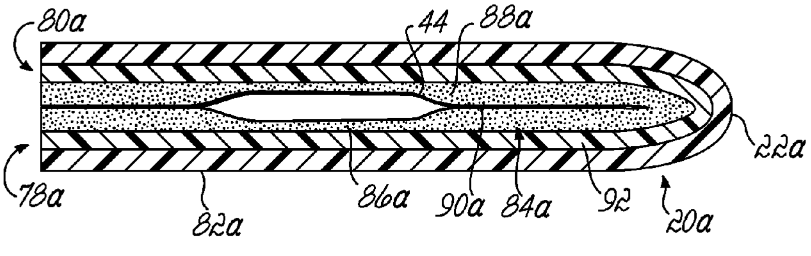
FIG. 2B is a cross-sectional view of an alternative embodiment of a portion of a partition used in accordance with the present invention having a middle layer.
Figure 2C:
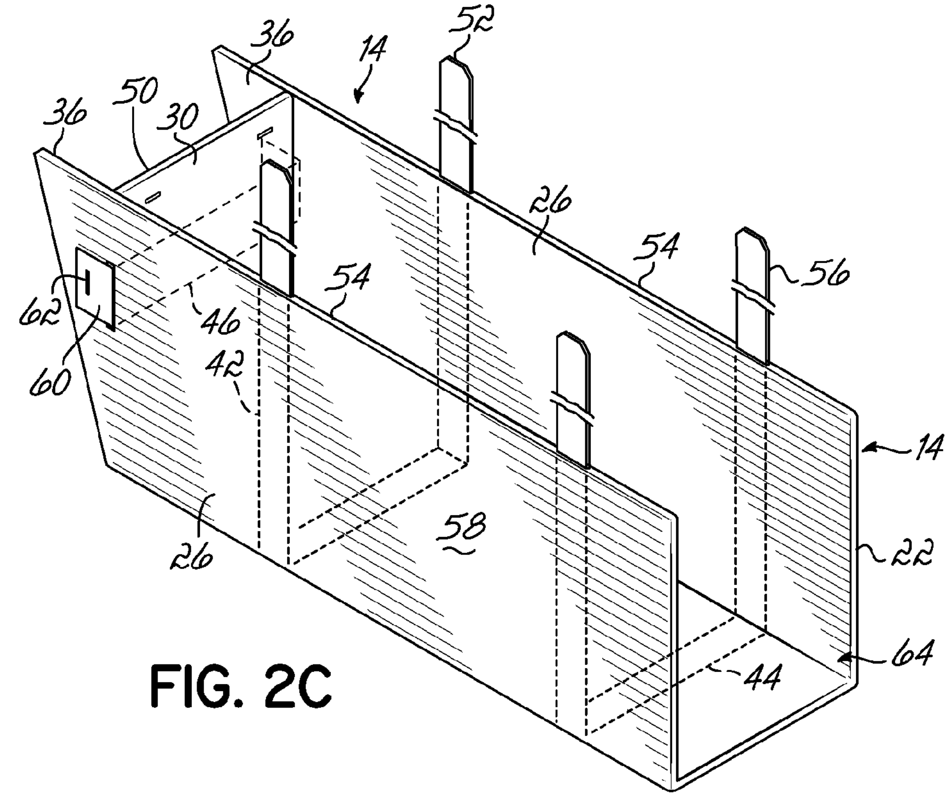
FIG. 2C is a perspective view of a tray created by folding and stapling the partition of FIG. 2.

In order to make the tray 14 shown in FIG. 2C from the partition 20 shown in FIG. 2, the partition 20 is folded along fold lines 28 and 32. The first connector 46 is passed through the slots 38 and wrapped around the outer surfaces 58 of the side portions 26 of the partition 20, which are now in a vertical orientation as shown in FIG. 2C. The ends 60 of the first connector 46 are fastened with fasteners such as staples 62 to the side portions 26 of the partition 20. The rear portion 30 of the partition 20 is now vertically oriented and becomes a rear wall of the assembled tray 14. Similarly, the side portions 26 of the partition 20 are now vertically oriented and become the side walls of the tray 14. The middle portion 24 of the partition 20 becomes the bottom of the tray 14. The tray 14 has an open front 64 with a rounded front edge 22 as shown in FIG. 2C. The rounded front edge 22 of each tray 14 prevents scratches, cuts and abrasions when workers insert or remove parts or products from cells 76 of the dunnage structure 10.

Figure 1A:
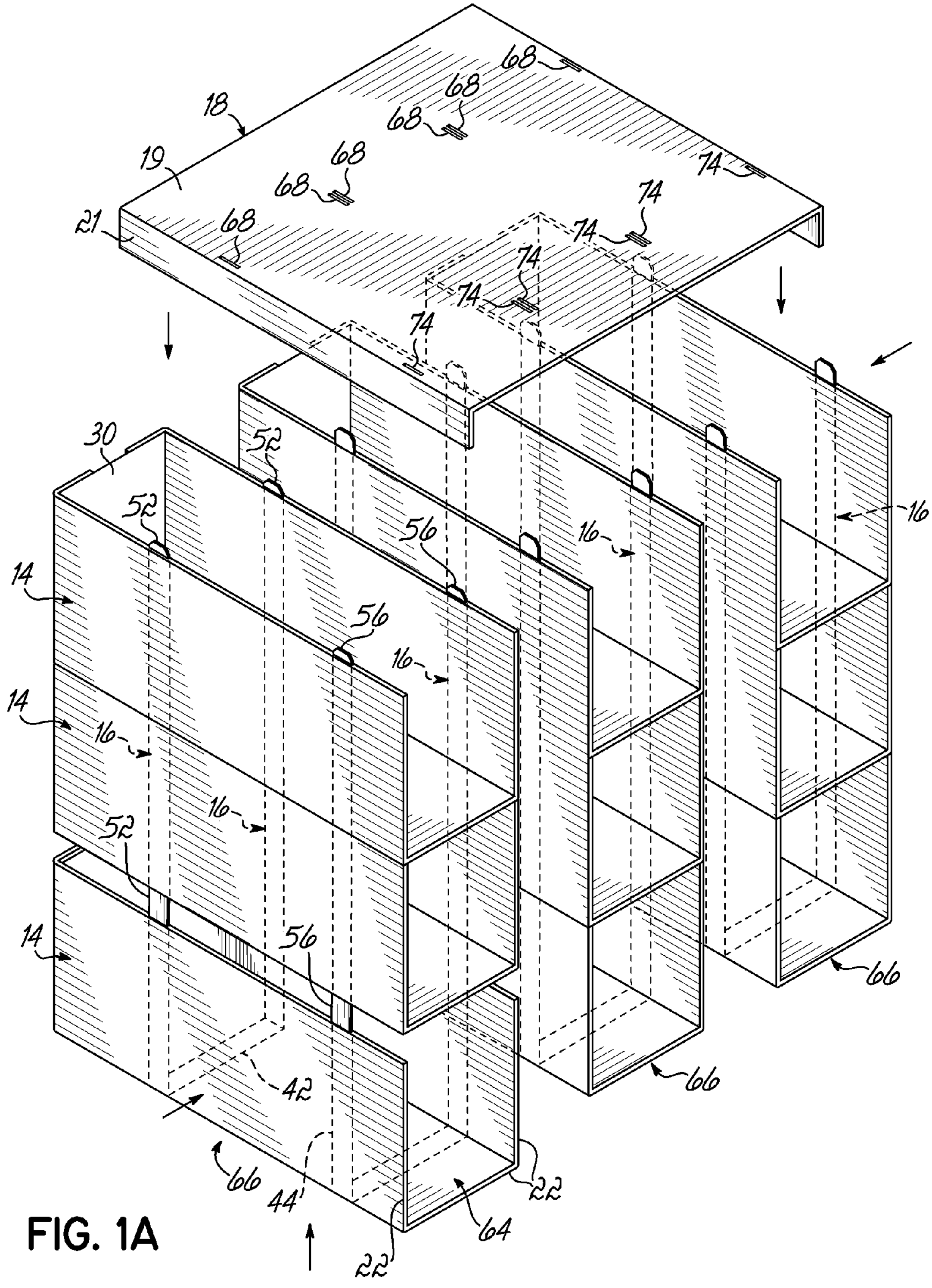
FIG. 1A is a perspective view of the dunnage structure of FIG. 1 in a partially disassembled condition.

As shown in FIG. 1A, in the lower tray of each column 66 of trays, the second connector 52, which is longer than the second passage 42, extends downwardly along one side wall 26, along the bottom 24 of the tray 14 and up along the opposed side wall 26, through second passage 42. Similarly, the third connector 56, which is longer than the third passage 44, extends downwardly along one side wall 26, along the bottom 24 of the tray 14 and up along the opposed side wall 26, through third passage 44.

In order to make dunnage structure 10, a plurality of trays 14 are secured together using multiple connectors 16. More specifically, the second and third connectors 52, 56 extend through passages in multiple stacked partitions in a column and function to align and connect these trays 14 together. More specifically, second connector 52 extends through the entire second passage 42 of the lowermost or bottom tray 14 of column 66 of trays 14, i.e. along the bottom 24 and side walls 26 of the bottom tray 14. The second connector 52 also extends through the side walls 26 only (not the bottom 24) of the middle and upper trays 14 of column 66. As shown in FIGS. 1 and 1A, second connector 52 is of such a length that end portions 69 thereof are passed through openings or slots 68 in the top 18 of the dunnage structure 10 and secured to the top 18 with fasteners 70.

Similarly, third connector 56 extends through the entire third passage 44 of the lowermost or bottom tray 14 of column 66 of trays 14, i.e. along the bottom 24 and side walls 26 of the bottom tray 14. The third connector 56 also extends through the side walls 26 only (not the bottom 24) of the middle and upper trays 14 of column 66. The third connector 56 is of such a length that end portions 72 thereof are passed through openings or slots 74 in the top 18 of the dunnage structure 10 and secured to the top 18 with fasteners 70. See FIG. 1.

The top 18 comprises a generally planar main portion 19 and two side portions 21 extending downwardly from the edges 23 of the main portion 19. Although one configuration of top is illustrated, other configurations or styles of tops may be used without departing from the spirit of the invention. The top may be equipped with other devices or structure which anchor or secure the end portions of the connectors and consequently allow the trays to hang or suspend from the top of dunnage structure. Alternatively, the top may be omitted and the connectors 16 secured to one or more portions or components of the container in which the dunnage structure 10 is housed or located.

Although FIGS. 1 and 1A show two connectors 52, 56 being used to secure together three aligned trays 14 in a vertically oriented column 66, three such columns 66 being used in dunnage structure 10, any number of connectors may be used to secure together any number of trays in a column. Similarly, the dunnage structure may have any desired number of columns of any desired height. Adjacent columns may be secured together or not. Dunnage structure 10 is shown in FIG. 1 as having three horizontally extending rows 96 of holding cells 76 across the dunnage structure 10.

The trays 14 of the dunnage structure 10 may be the same size as shown in FIGS. 1 and 1A in order that the individual holding cells 76 of the dunnage structure 10 are evenly sized. Alternatively, the trays 14 of the dunnage structure 10 may be sized differently in order to form holding cells 76 of the dunnage structure of differing sizes to accept different sized parts or products.

In one embodiment of the present invention each of the partitions 20 is made of a multilayered material. Each of the partitions 20 is a two-ply partition which may be at least partially formed by one of the methods shown and described in U.S. Pat. No. 7,344,043, which is fully incorporated herein. FIG. 2A illustrates one of the partitions 20 in detail according to one embodiment of the present invention. As best illustrated in FIG. 2A, partition 20 has two opposed plies 78 and 80 which are parallel to one another and joined together in select or predetermined locations (outside or external of passages 16). The partition 20 has an outer layer or skin 82 assuming a generally inverted U-shaped configuration when the partition 20 is folded and the opposed plies 78 and 80 at least partially secured together. A wide variety of materials may be used for the outer layer or skin 82 including, but not limited to, woven polyesters, non-woven polypropylenes, foamed and solid polyolefins, latex, non-polyolefin plastics.

In the embodiment shown in FIG. 2A, inside the outer layer or skin 82 is a foam interior 84 comprising two layers 86, 88 joined together along interior surfaces 90. A wide variety of materials may be used for the foam interior 84 of the partition 20. In one preferred embodiment, the foam interior 84 is a polyolefin foam. However, other materials other than foam which may be welded or joined together may be used in accordance with the present invention. If desired, the outer skin 82 may be omitted, in which case, the entire partition 20 would be made of foam. FIG. 2A illustrates in cross-section the third passage 44 shown in FIG. 2 of partition 20. In this third passage 44, as in any of the passages 16 of the partitions 20, the adjoining layers 86, 88 of the foam interior 84 are not secured together, but instead are separable to allow a connector such as third connector 56 to pass between the adjoining layers 86, 88 of the foam interior 84. In one or more selected or predetermined areas outside the passages 16 the adjoining layers 86, 88 of the foam interior are fused or parent welded together.

FIG. 2B illustrates an alternative embodiment of two-ply partition 20*a*. In this embodiment, partition 20*a* has an additional layer incorporated therein when compared to the partition 20 shown in FIG. 2A. In this alternative embodiment, the partition 20*a* has an outer layer or skin 82*a*, a foam interior 84*a* comprising two layers 86*a*, 88*a* joined together along surfaces 90*a*. In addition, a middle stiffening layer 92 is secured between the outer layer or skin 82*a* and the foam interior 84*a*. Like the outer layer 82*a* of the partition 20*a*, the middle stiffening layer 92 assumes a generally inverted U-shaped configuration when the partition 20*a* is folded and the opposed plies 78*a* and 80*a* at least partially secured together, as shown in FIG. 2B. A wide variety of materials may be used for the middle stiffening layer or skin 92 including, but not limited to, various plastics. If desired, additional middle stiffening layers of any suitable material (not shown) may be added to the partition. The partition 20*a* has a smooth edge 22*a* like the partition 20 shown in FIG. 2A created by the folding of a partition blank (not shown) and securing the opposed plies 78*a*, 80*a* together in select locations.

Figure 3:
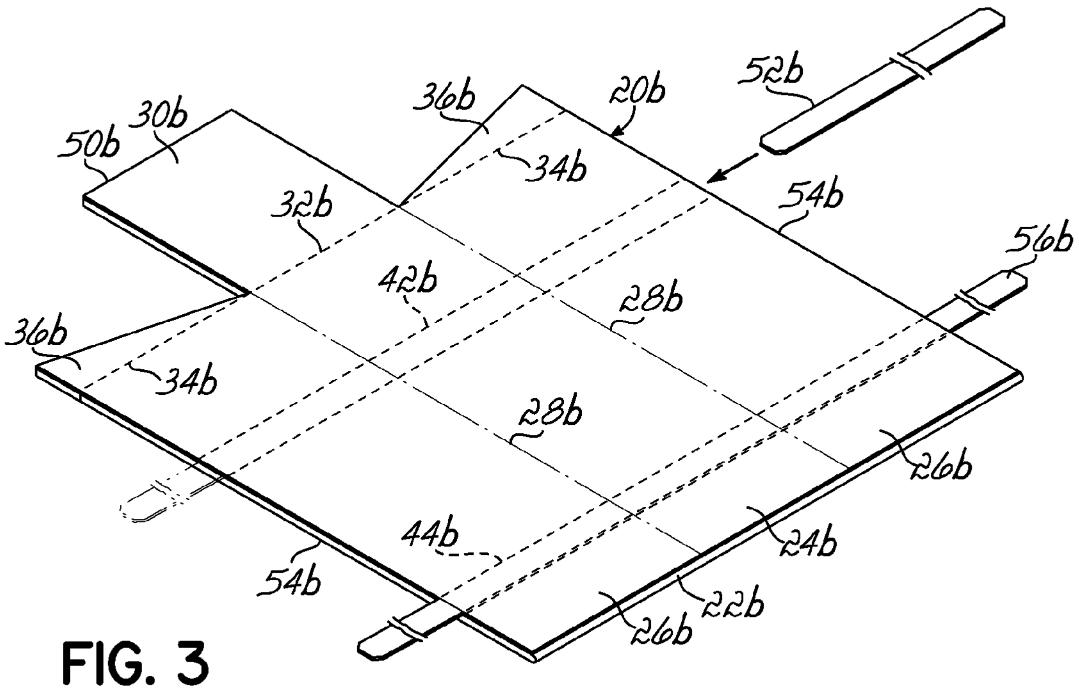
FIG. 3 is a perspective view of another two-ply partition used to form a dunnage structure like that of FIG. 1 with connectors.
Figure 3A:
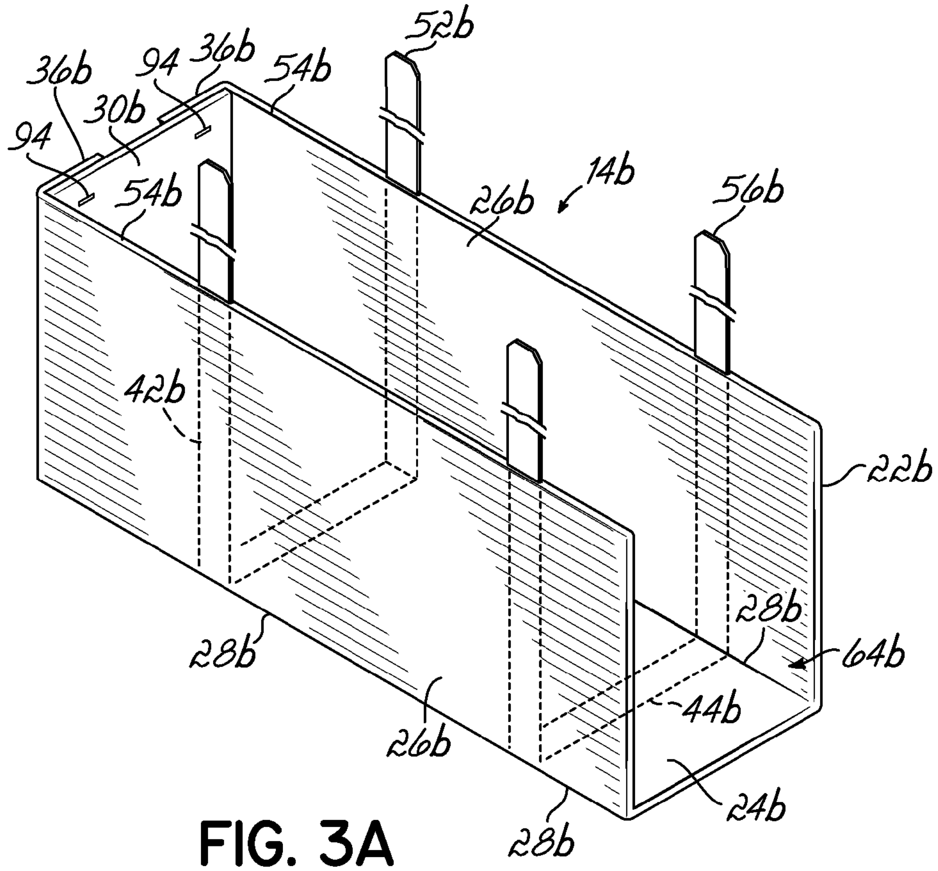
FIG. 3A is a perspective view of another tray created by folding and stapling the partition of FIG. 3.
Figure 3B:
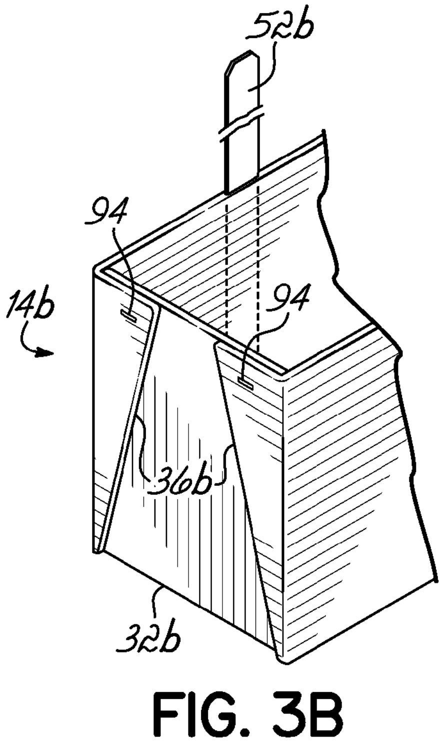
FIG. 3B is a rear perspective view of the tray of FIG. 3A.

FIGS. 3, 3A and 3B illustrate an alternative embodiment of partition 20*b* which is used to form a tray 14*b*. Each tray 14*b*, shown in FIGS. 3A and 3B is formed from a two-ply partition 20*b* having a rounded front edge 22*b*. The partition 20*b* has a middle portion 24*b* and two opposed side portions 26*b*, the middle portion 24*b* being separated from the side portions 26*b* by parallel fold lines 28*b*. The partition 20*b* has a generally rectangular rear portion 30*b* separated from the remainder of the middle portion 24*b* by a fold line 32*b*. The partition 20*b* has two additional fold lines 34*b* which separate two generally triangular locking portions 36*b* from the remainder of the side portions 26*b*, as shown in FIG. 3.

As shown in FIG. 3, the partition 20*b* has no passage through the rear portion 30*b* of the partition 20*b*. Instead, partition 20*b* has a first passage 42*b* extending through middle and side portions 24*b*, 26*b*, respectively, and a second passage 44*b* extending through middle and side portions 24*b*, 26*b*, respectively. Although the drawings show the partition 20*b* having two parallel passages 42*b* and 44*b*, the partition 20*b* may have any number of passages in any desired locations.

FIG. 3 shows a first connector 52*b* entering first passage 42. When fully inserted into the passage 42, the first connector 52*b* extends beyond the opposed outer side edges 54*b* of the side portions 26*b* of partition 20*b*. FIG. 3 further shows a second connector 56*b* extending through second passage 42*b* and beyond the opposed outer side edges 54*b* of the side portions 26*b* of partition 20*b*.

In order to make the tray 14*b* shown in FIGS. 3A and 3B from the partition 20*b* shown in FIG. 3, the partition 20*b* is folded along fold lines 28*b*, 32*b* and 34*b*. The rear portion 30*b* is folded along fold line 32*b* into a vertical position or orientation. The locking portions 36*b* are then wrapped around the outer surface of the rear portion 30*b* of the partition 20*b* and secured thereto with fasteners 94, as shown in FIG. 3B. The side portions 26*b* are folded along fold lines 28*b* into a vertical orientation as shown in FIG. 3A. The rear portion 30*b* of the partition 20*b* is now vertically oriented and becomes the rear wall of the tray 14*b*. Similarly, the side portions 26*b* of the partition 20*b* are now vertically oriented and become the side walls of the tray 14*b*. The middle portion 24*b* of the partition 20*b* becomes the bottom of the tray 14*b*. The tray 14*b* has an open front 64*b* with a rounded front edge 22*b* as shown in FIG. 3A. The rounded front edge 22*b* of each tray 14*b* prevents scratches, cuts and abrasions when workers insert or remove parts or products from cells of the dunnage structure. In addition, the rounded front edge 22*b* of each tray 14*b* aids the insertion and removal of part or products from the cells of the dunnage structure.

Figure 4:
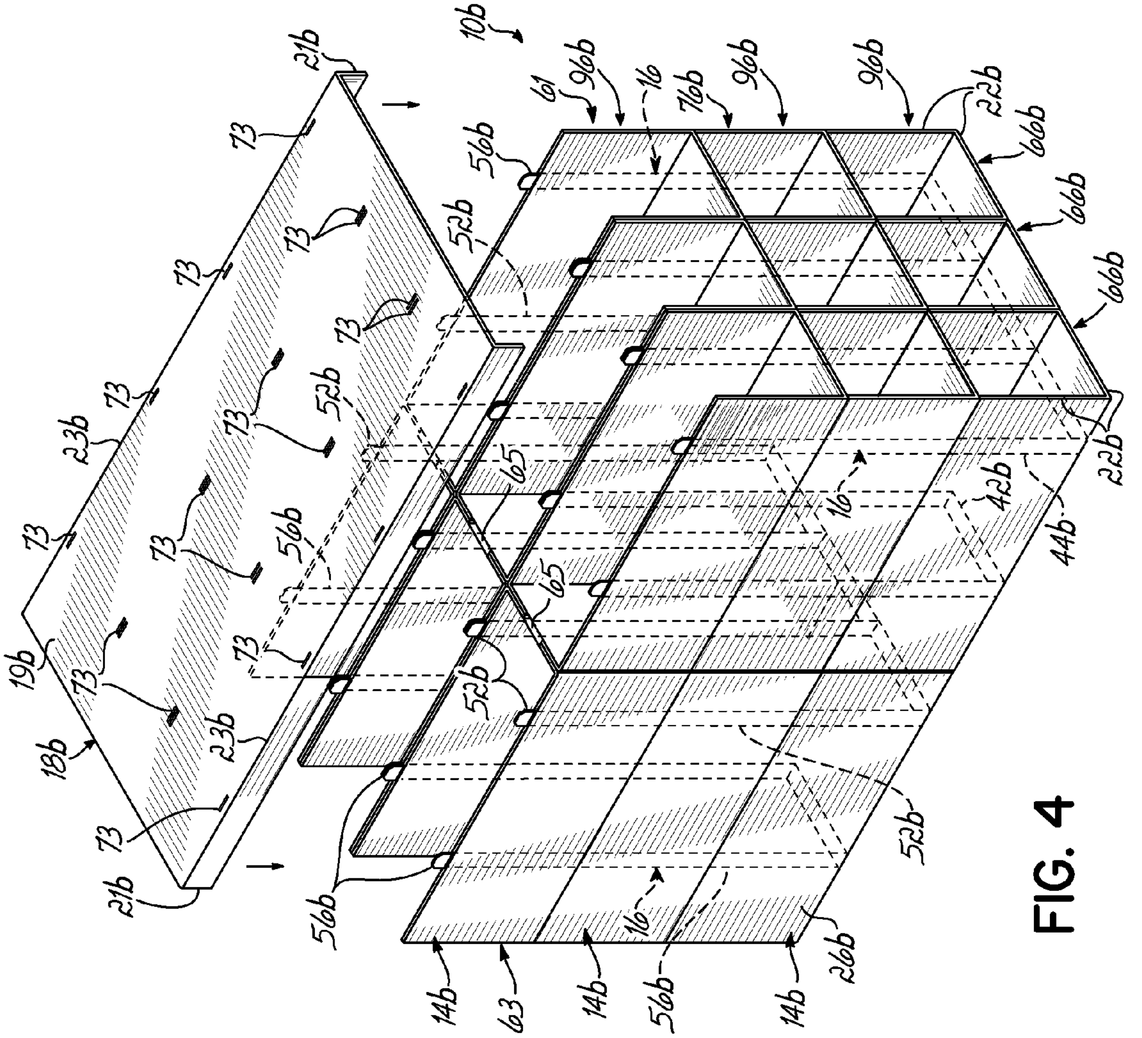
FIG. 4 is a perspective view of another dunnage structure built in accordance with the present invention in a partially disassembled condition.

FIG. 4 illustrates an alternative dunnage structure 10*b* for use in a horizontal dispensing container open on opposed sides. Dunnage structure 10*b* comprises two sides of dunnage 61, 63, each side comprising three columns 66*b* of trays 14*b*, each column 66*b* comprising three trays 14*b*. Therefore, the dunnage structure 10*b* comprises nine holding cells 76*b* on each side 61 and 63, three across in a row 96*b* and three down in each column 66*b*. In total, this dunnage structure 10*b* has eighteen cells 76*b*, all of which may be filled with product for shipment. As shown in FIG. 4, the back or rear walls 30*b* of the trays 14*b* of one side 61 abut and are joined in any known manner to the back or rear walls 30*b* of the trays 14*b* of the other side 63 of the dunnage structure 10*b*. Although FIG. 4 shows clips 65 joining the back walls 30*b* of trays 14*b*, any other fastening device such as rivets or welds may be used.

Although the dunnage structure 10*b* is illustrated being constructed of trays 10*b*, as shown in detail in FIGS. 3, 3A and 3B, the dunnage structure 10*b* may be created using other trays, similar to trays 14, shown in detail in FIGS. 2 and 2A. Any of the two-ply partitions having passages described herein may be used in any of the dunnage structures shown or described herein.

Dunnage structure 10*b* further comprises a top 18*b*, like top 18, having a generally planar main portion 19*b* and two side portions 21*b* extending downwardly from the edges 23*b* of the main portion 19*b*. The top 18*b* has slots 73 sized so that the tops of the connectors 52*b*, 56*b* may pass therethrough and be secured to the top 18*b*. Although one configuration of top is illustrated, other configurations or styles of tops may be used without departing from the spirit of the invention. Any structure which forms part of the container may be used to retain or hold the top end portions of the connectors 16, in which case the top may be omitted from the dunnage structure.

Figure 5:
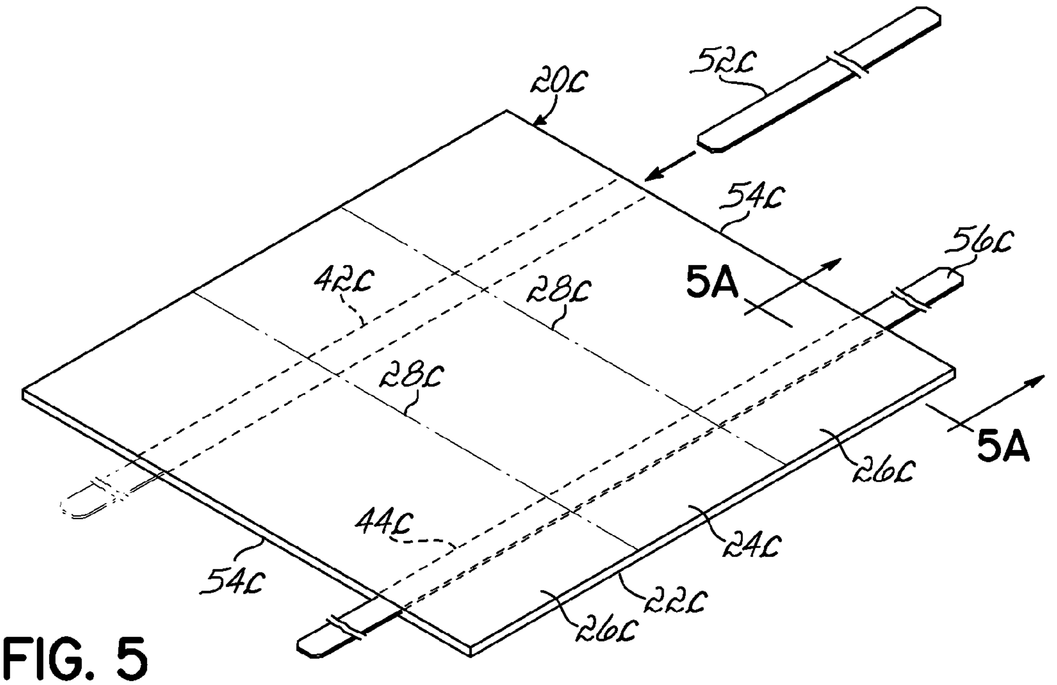
FIG. 5 is a perspective view of another two-ply partition used to form a dunnage structure like that of FIG. 6 with connectors.
Figure 5A:
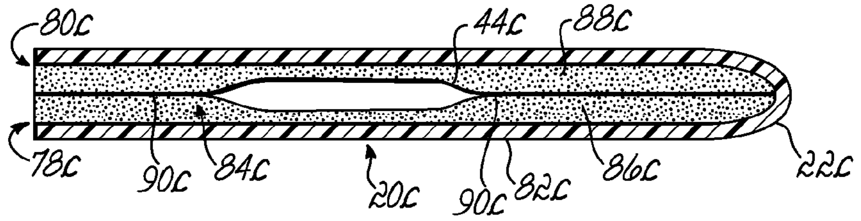
FIG. 5A is a cross-sectional view taken along the line 5A-5A of FIG. 5.
Figure 5B:
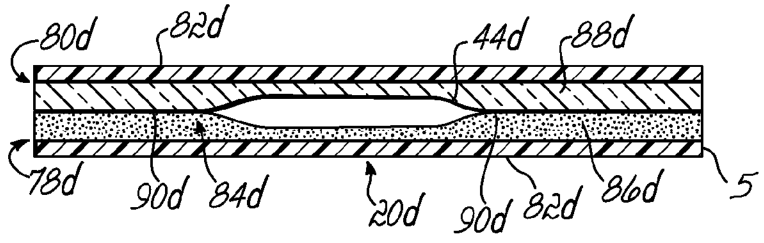
FIG. 5B is a cross-sectional view of an alternative embodiment of a portion of a partition.
Figure 5C:
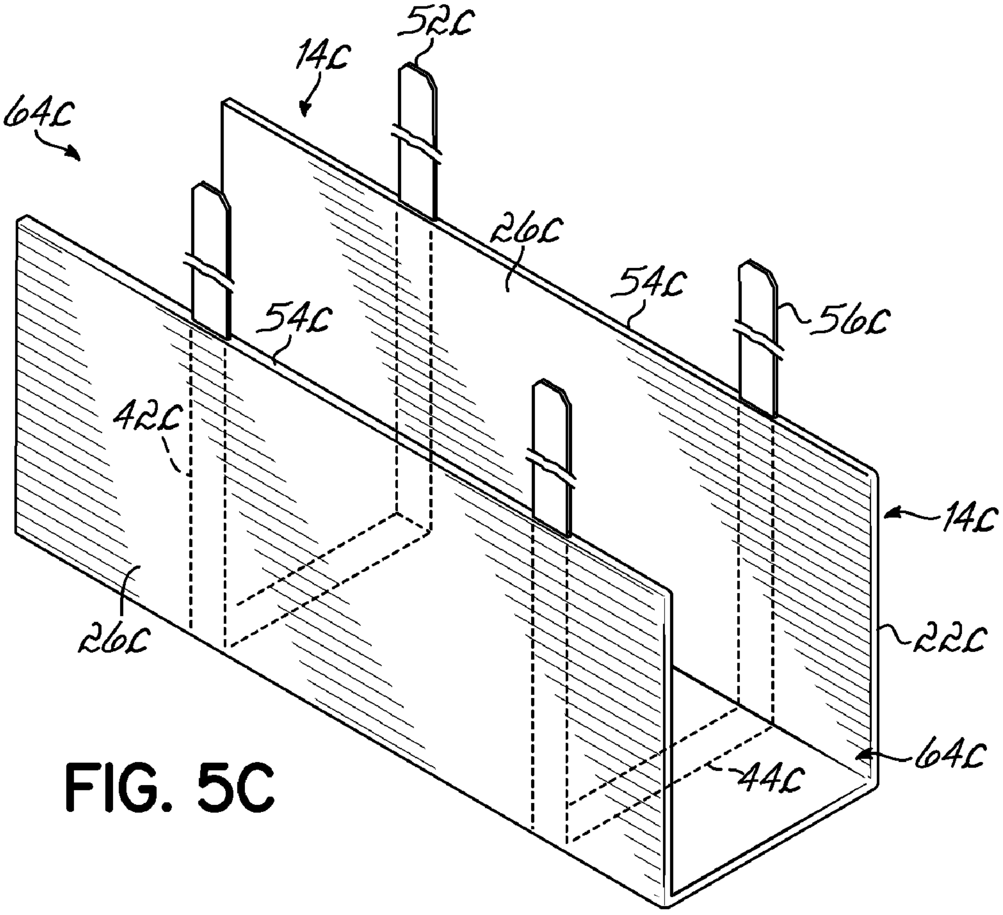
FIG. 5C is a perspective view of a tray created by folding the partition of FIG. 5.

FIGS. 5, 5A and 5C illustrate an alternative embodiment of partition 20*c* which is used to form a tray 14*c* open on opposite ends. Each tray 14*c*, shown in FIG. 5C, is formed from a two-ply partition 20*c* having a rounded front edge 22*c*. As shown in FIG. 5, partition 20*c* has a middle portion 24*c* and two opposed side portions 26*c*, the middle portion 24*c* being separated from the side portions 26*c* by parallel fold lines 28*c*.

As shown in FIG. 5, the partition 20*c* has no rear portion and therefore, when folded along fold lines 28*c* forms tray 14*c* having opposed open ends 64*c*. As shown in FIG. 5, partition 20*c* has parallel first and second passages 42*c*, 44*c* extending through middle and side portions 24*c*, 26*c* of partition 20*c*. Although the drawings show the partition 20*c* having two parallel passages 42*c* and 44*c*, the partition 20*c* may have any number of passages in any desired locations extending in any desired direction. This applies to any of the partitions shown or described herein.

FIG. 5 shows a first connector 52*c* entering first passage 42*c*. When fully inserted into the passage 42*c*, the first connector 52*c* extends beyond the opposed outer side edges 54*c* of the side portions 26*c* of partition 20*c*. FIG. 5 further shows a second connector 56*c* extending through second passage 42*c* and beyond the opposed outer side edges 54*c* of the side portions 26*c* of partition 20*c*. Although passages 42*c*, 44*cc* are illustrated extending longitudinally perpendicular to the fold lines 28*c*, it is within the scope of present invention that the passages extend transversely parallel the fold lines 28*c* in certain applications or structures. This applies to any of the partitions and dunnage structures described or illustrated herein.

In order to make tray 14*c* shown in FIG. 5C from the partition 20*c* shown in FIG. 5, partition 20*c* is folded along fold lines 28*c* to bring the side portions 26*c* into a vertical orientation. The side portions 26*c* of partition 20*c* become vertically oriented side walls of the tray 14*c* when the tray is joined to other trays. The middle portion 24*c* of the partition 20*c* becomes the bottom of the tray 14*c*. The tray 14*c* has two opposed open ends 64*c* with a rounded front edge 22*c* at one end as shown in FIG. 5C. Alternatively, each open end 64 may have a rounded front edge. The rounded front edge 22*c* of each tray 14*c* prevents scratches, cuts and abrasions when workers insert or remove parts or products from cells of the dunnage structure. In addition, the rounded front edge 22*c* of each tray 14*c* aids the insertion and removal of part or products from the cells of the dunnage structure 10*c*.

FIG. 5B illustrates a portion of an alternative embodiment of two-ply partition 20*d*. In this embodiment, partition 20*d* comprises two dissimilar materials fused or parent welded to each other in select or predetermined locations 90*d* beside the passages (only one 44*d* being shown in FIG. 5B) of the partition. In this alternative embodiment, the partition 20*d* has an outer layer or skin 82*d* on both sides of the partition 20*d*, a foam interior 84*d* comprising two dissimilar layers 86*d*, 88*d* fused or parent welded together along surfaces 90*d* beside the passages of the partition. The opposed plies 78*d* and 80*d* of the foam interior 84*d* are at least partially secured together along surfaces 90*d*, as shown in FIG. 5B. If desired, additional middle stiffening layers of any suitable material (not shown) may be added to the partition 20*d*. The partition 20*d* lacks a smooth edge but instead has a blunt edge 5 at the front thereof. This concept of making a partition by fusing or parent welding different materials may be used in any of the partitions or any of the dunnage structures contemplated or described or shown herein.

Figure 6:
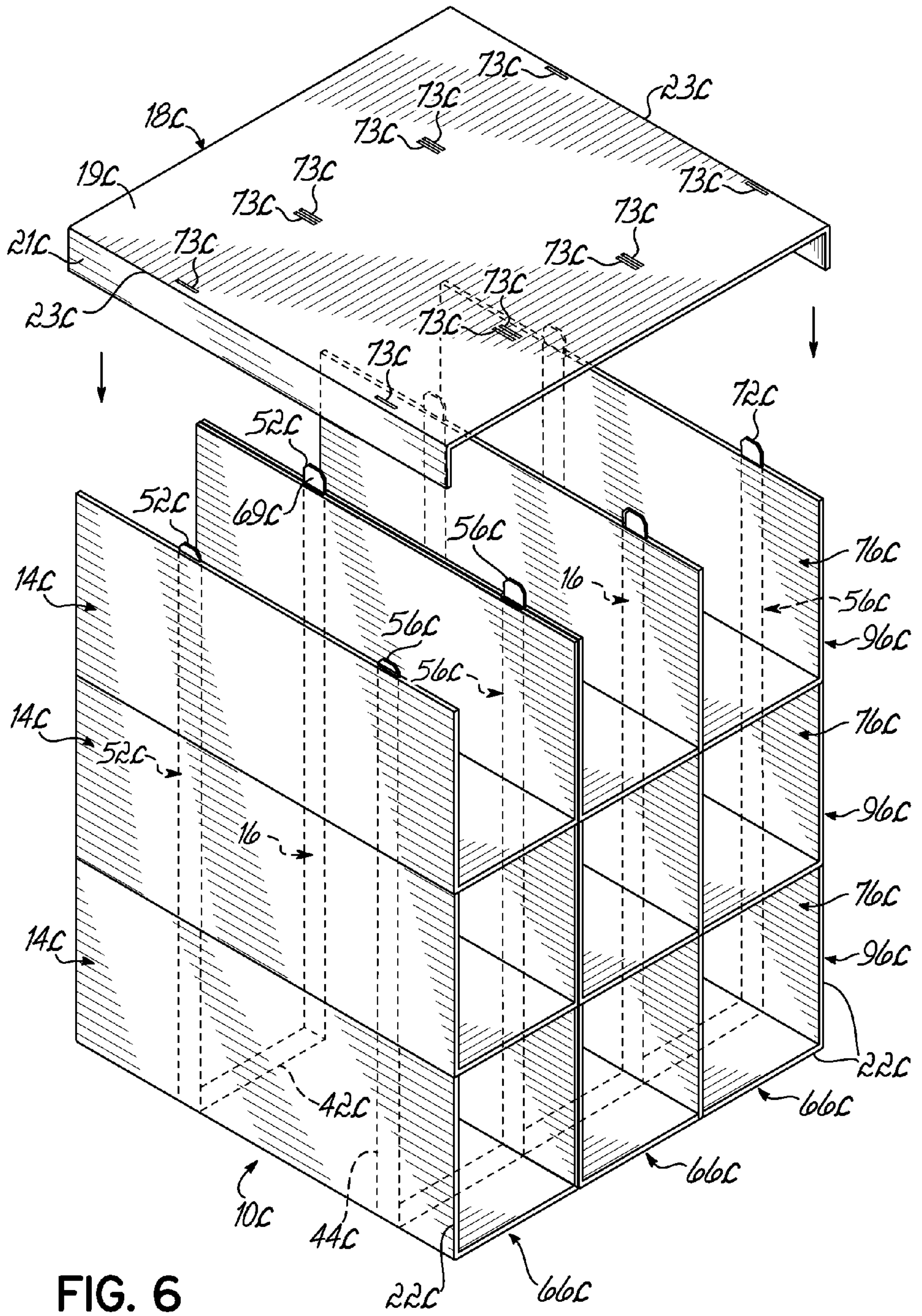
FIG. 6 is a perspective view of another dunnage structure built in accordance with the present invention in a partially disassembled condition.

FIG. 6 illustrates an alternative dunnage structure 10*c* comprising three columns 66*c* of trays 14*c*, each column 66*c* comprising three trays 14*c*. Therefore, the dunnage structure 10*c* comprises nine holding cells 76*c*, three across in a row 96*c* and three down in each column 66*c*. Although the dunnage structure 10*c* is illustrated being constructed of multiple identical trays 14*c*, as shown in detail in FIG. 5C, the dunnage structure 10*c*, or any dunnage structure described herein, may be created using trays of different sizes or shapes suited to ship a particular part or product. Any of the two-ply partitions having passages described herein may be used in any of the dunnage structures shown or described herein, such as dunnage structure 10*c* having opposed open ends for use in a container open on opposed sides.

Dunnage structure 10*c* further comprises a top 18*c* having a generally planar main portion 19*c* and two side portions 21*c* extending downwardly from the edges 23*c* of the main portion 19*c*. Although one configuration of top is illustrated, other configurations or styles of tops may be used without departing from the spirit of the invention.

As shown in FIG. 6, second and third connectors 52*c*, 56*c* are each of such a length that end portions 69*c*, 72*c* thereof may be passed through openings or slots 73*c* in the top 18*c* of the dunnage structure 10*c* and secured to the top 18*c* with fasteners (not shown). Any structure which forms part of the container may be used to retain or hold the top end portions of the connectors 16, in which case the top may be omitted from the dunnage structure.

Figure 7:
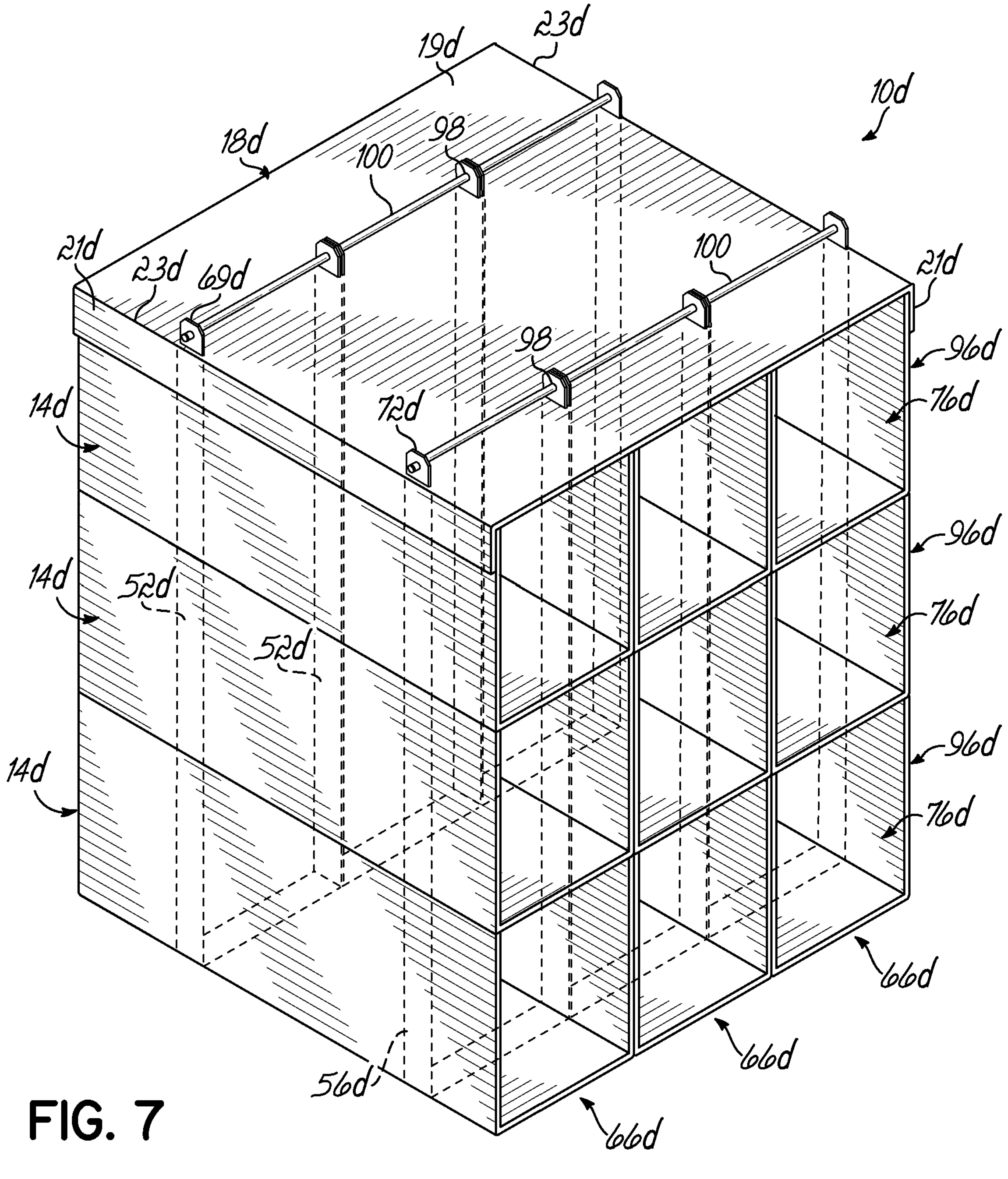
FIG. 7 is a perspective view of one embodiment of dunnage structure for use in a container.

FIG. 7 illustrates an alternative dunnage structure 10*d* comprising three columns 66*d* of trays 14*d*, each column 66*d* comprising three trays 14*d*. Therefore, the dunnage structure 10*d* comprises nine holding cells 76*d*, three across in a row 96*d* and three down in each column 66*d*. Although the dunnage structure 10*d* is illustrated being constructed of multiple identical trays 14*d*, the dunnage structure 10*d* may be created using trays of different sizes or shapes suited to ship a particular part or product.

As shown in FIG. 7, dunnage structure 10*d* further comprises a top 18*d* having a generally planar main portion 19*d* and two side portions 21*d* extending downwardly from the edges 23*d* of the main portion 19*d*. Although one configuration of top is illustrated, other configurations or styles of tops may be used without departing from the spirit of the invention. The top 18*b* has slots 73 sized so that the tops of the connectors 52*b*, 56*b* may pass therethrough and be secured to the top 18*b*. Although one configuration of top is illustrated, other configurations or styles of tops may be used without departing from the spirit of the invention.

As shown in FIG. 7, dunnage structure 10*d* further comprises three different sets of first and second connectors 52*d*, 56*d*, each set of connectors 52*d*, 56*d* supporting one column 66*d* of three trays 14*d*. However, rather than being secured to the top 18*d* with fasteners, the end portions 69*d*, 72*d* of connectors 52*d*, 56*d*, respectively, each have holes 98 therein through which a locking member 100 passes. Although the locking member 100 is shown as being a bar having a circular cross-section, any other suitable locking member may be used to keep the first and second connectors 52*d*, 56*d* from falling downwardly through the passages of the trays 14*d*. This method of using a locking member to pass through portions of the connectors may be used in any of the embodiments of dunnage structure contemplated by the present invention including those described or shown herein.

Figure 8:
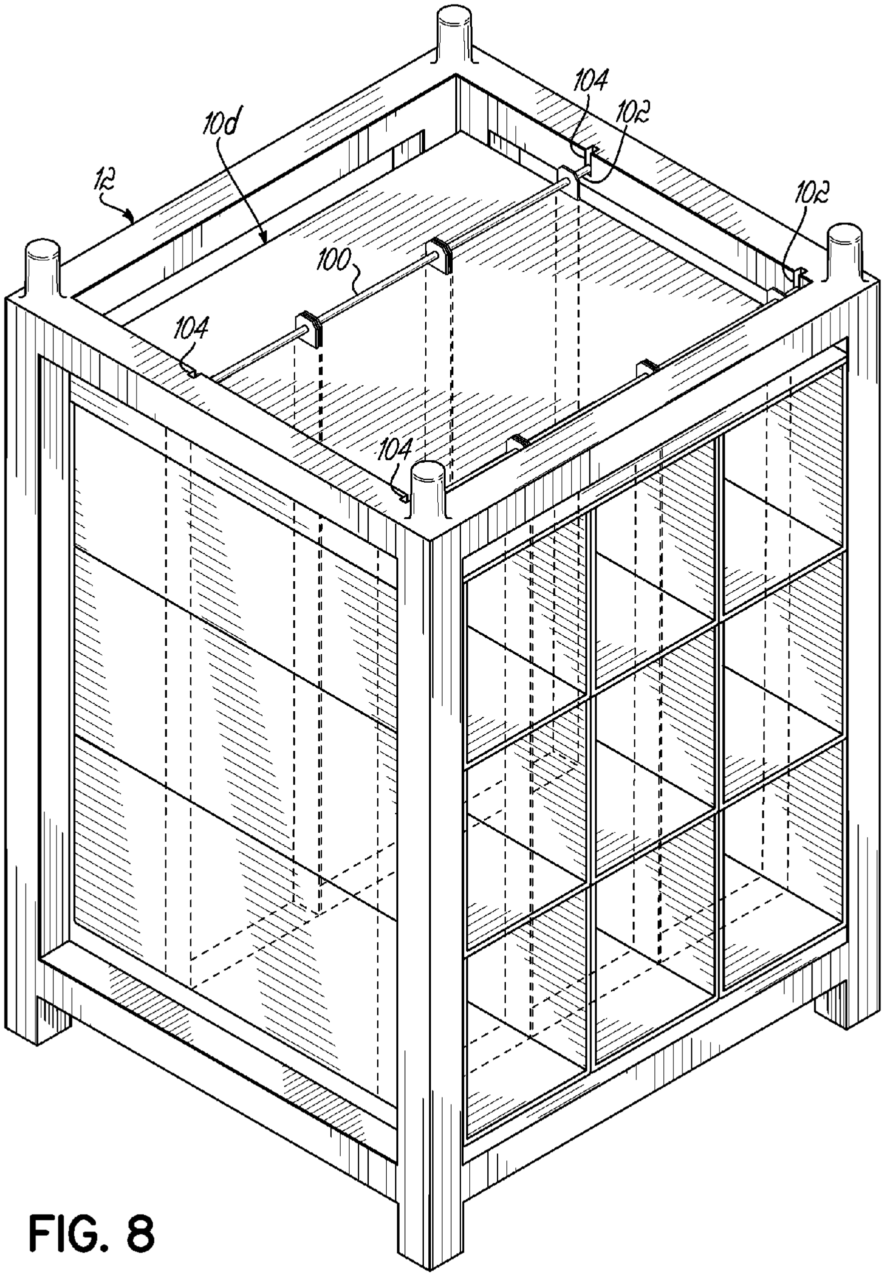
FIG. 8 is a perspective view illustrating the dunnage structure of FIG. 7 secured inside a metal rack.

Dunnage structure 10*d* may be secured in metal rack 12 using several different methods, one of which is shown in FIG. 8. Referring to FIG. 8, the rack 12 may have grooves 104 therein. End portions 102 of each locking member 100 may be aligned and engaged with grooves 104. This locking assembly of grooves 104 and locking member 100 retains the dunnage structure 10*d* in place inside the interior of metal rack 12 or any other suitable container.

Figure 9:
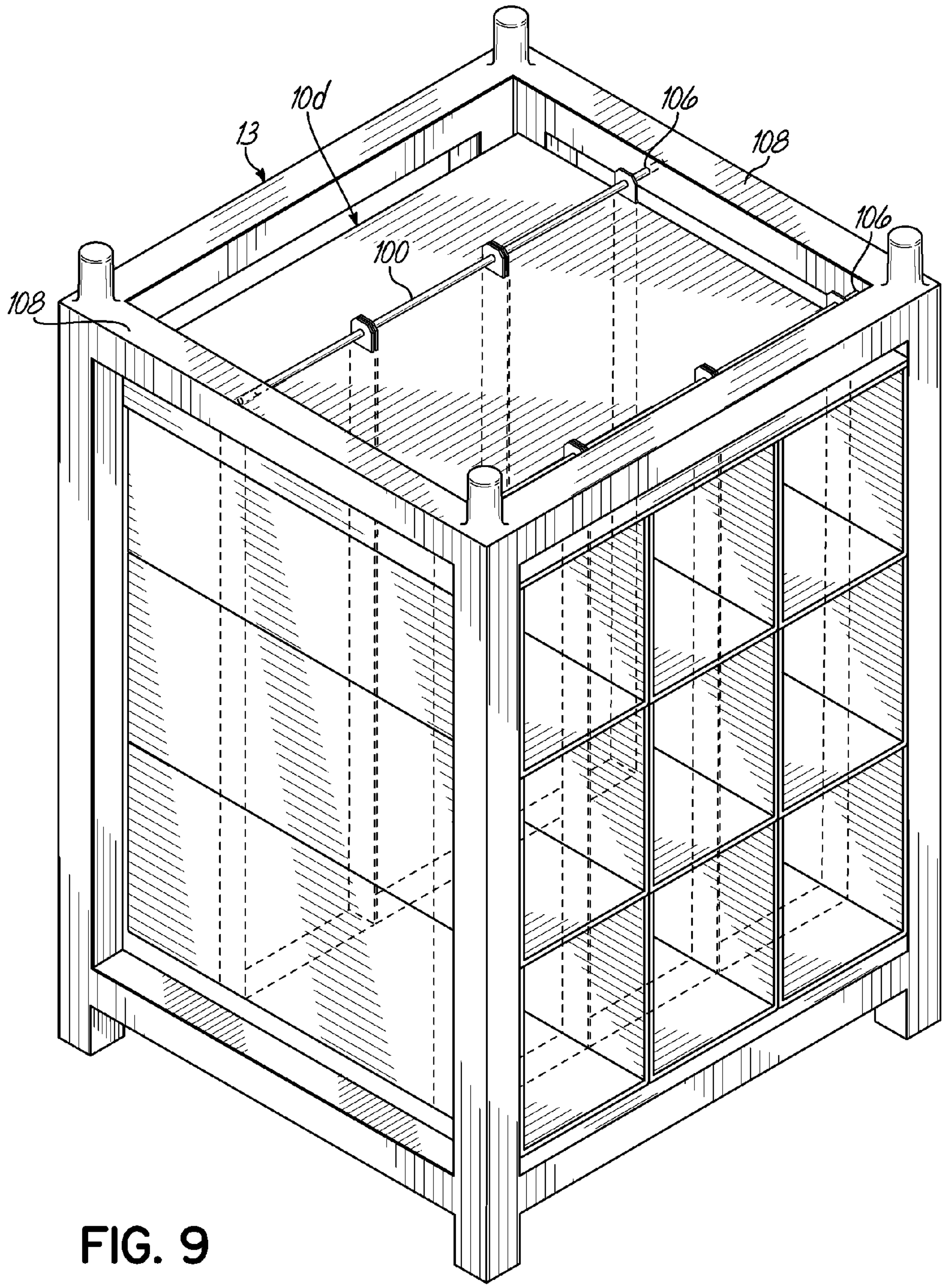
FIG. 9 is a perspective view illustrating the dunnage structure of FIG. 7 secured inside a different metal rack than the metal rack of FIG. 8.

Another method of securing dunnage structure 10*d* in a metal rack is shown in FIG. 9. This rack 13, rather than having grooves 104, like the rack 12 shown in FIG. 8, has holes 106 in the upper side bars 108. The end portions 102 of each locking member 100 fit inside the holes 106 in the upper side bars 108 of rack 13. The locking members 100 support the dunnage structure 10*d* inside the rack 13.

Figure 10:
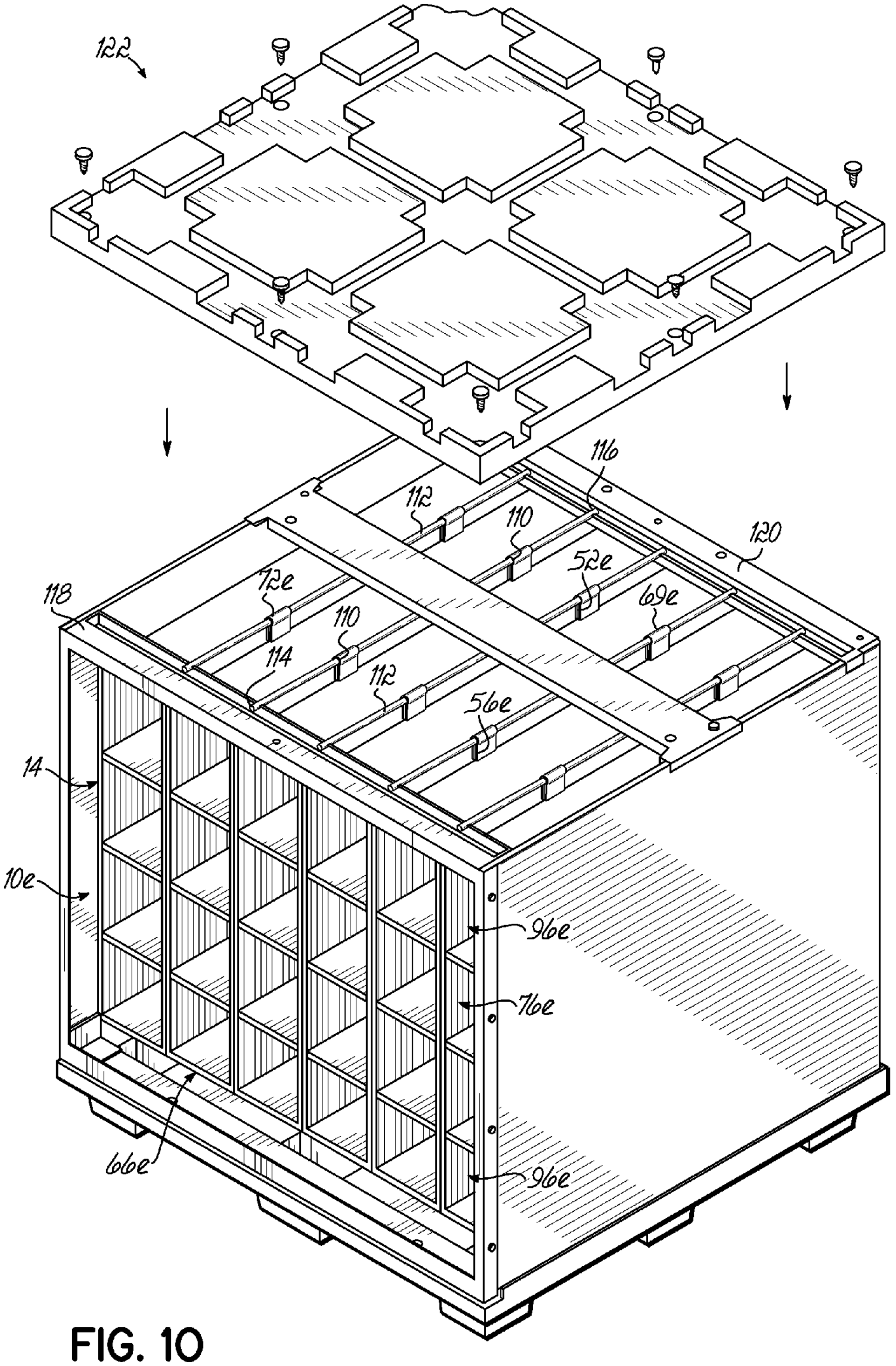
FIG. 10 is a perspective view of one embodiment of dunnage structure of the present invention in an assembled condition located inside a horizontal dispensing container, the top being shown disassembled.

FIG. 10 illustrates an alternative embodiment of dunnage structure 10*e* comprising six columns 66*e* and four rows 96*e* of cells 76*e* inside a container 122. The dunnage structure 10*e* comprises a plurality of trays 14 as described above joined together with first and second connectors 52*e* and 56*e*. The end portions 69*e*, 72*e* of the connectors 52*e*, 56*e*, respectively are each overlapped and secured together to form a loop 110. Locking members 112 are passed through the loops 110. End portions 114 of the locking members 112 are secured inside grooves 116 formed in the front and rear braces 118, 120, respectively, of container 122. This container is described in detail in U.S. Pat. No. 7,360,663, which is fully incorporated herein. However, this method of forming loops in the connectors may be used in any dunnage structure along with the concept of passing locking members through the connector loops, the locking members being engaged with the container and supporting the dunnage structure.

Figure 11:
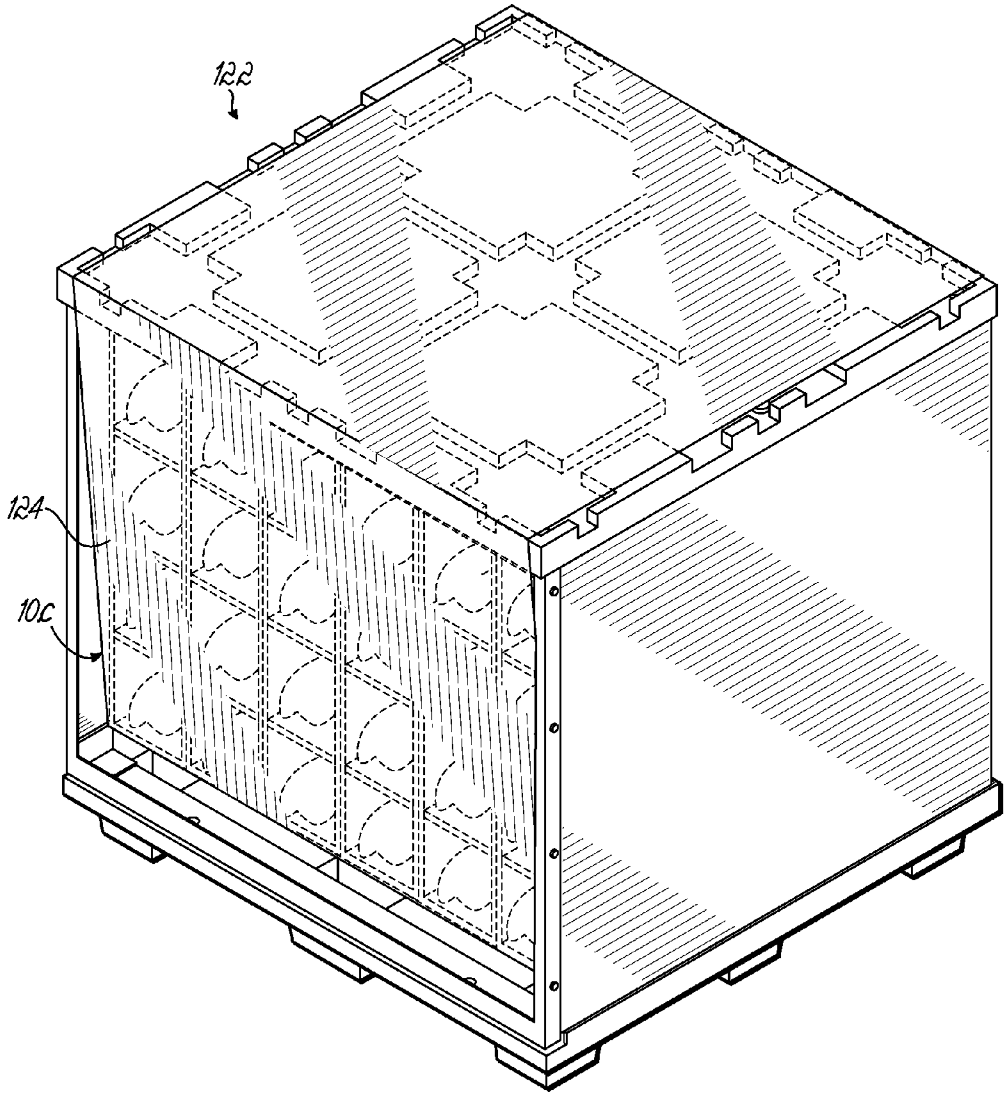
FIG. 11 a perspective view of the horizontal dispensing container of FIG. 10 with a dunnage structure inside and fully assembled.

FIG. 11 illustrates the container 122 of FIG. 10 in an assembled condition. The dunnage structure 10*e* is covered in the front of the container 122 with a cover 124, using any method or structure known in the industry.

While we have described only a few embodiments of our invention, we do not intend to be limited except by the scope of the following claims.

What is claimed is:

1. A partition for use in a dunnage structure, said partition comprising:

a first ply and a second ply, said first ply being parent welded to said second ply at predetermined locations, each of said plies comprising an interior polyolefin foam portion and an exterior skin, said partition having at least one passage extending through one outer edge and an opposed outer edge to allow multiple partitions to be secured together using connectors extending through said at least one passage, wherein said plies are not parent welded to each other along said at least one passage.

2. The partition of claim 1 wherein said exterior skin of said partition comprises a woven polyester.

3. The partition of claim 1 wherein said exterior skin of said partition comprises a plastic material.

* * * * *